(12) United States Patent
Kamohara et al.

(10) Patent No.: US 7,997,084 B2
(45) Date of Patent: Aug. 16, 2011

(54) HYBRID POWER SYSTEM AND METHOD OF OPERATING THE SAME

(75) Inventors: Satoru Kamohara, Takasago (JP); Akihiko Saito, Takasago (JP); Takashi Sonada, Takasago (JP); Yasuhiro Takashima, Takasago (JP); Satoko Fujii, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 983 days.

(21) Appl. No.: 11/638,538

(22) Filed: Dec. 14, 2006

(65) Prior Publication Data
US 2007/0151256 A1 Jul. 5, 2007

(30) Foreign Application Priority Data

Dec. 15, 2005 (JP) .................. 2005-362225

(51) Int. Cl.
*F02C 6/08* (2006.01)
(52) U.S. Cl. ........... 60/782; 60/781; 60/39.464; 60/801; 60/783; 60/785; 60/795
(58) Field of Classification Search ............. 60/781, 60/39.464, 801, 783, 782, 785, 795
See application file for complete search history.

(56) References Cited

U.S. PATENT DOCUMENTS

| 5,622,043 A * | 4/1997 | Humphries, Jr. ........... 60/39.182 |
| 5,688,296 A * | 11/1997 | Andrus et al. ............... 48/197 R |
| 2007/0125064 A1* | 6/2007 | Sonoda et al. ............. 60/39.182 |

FOREIGN PATENT DOCUMENTS

| JP | 5-248260 A | 9/1993 |
| JP | 8-144784 A | 6/1996 |
| JP | 2005-207353 A | 8/2005 |

* cited by examiner

*Primary Examiner* — Michael Cuff
*Assistant Examiner* — Craig Kim
(74) *Attorney, Agent, or Firm* — Birch, Stewart, Kolasch & Birch, LLP

(57) ABSTRACT

A gasifying furnace gasifies solid fuel or liquid fuel. A gas turbine drives a turbine to generate power by using combustion gas generated by burning mixed gas of compressed air compressed in a compressor and gas generated in the gasifying furnace in a combustor. A booster boosts compressed air bled from the compressor, and feed the compressed air to the gasifying furnace. A bleed source valve is provided in a bleed line between the compressor and the booster. An abnormality stop controller stops the booster and the gas turbine, based on an opening angle of the bleed source valve or a bleed pressure on an upstream side of the bleed source valve.

4 Claims, 7 Drawing Sheets

HYBRID POWER SYSTEM AND METHOD OF OPERATING THE SAME

BACKGROUND OF THE INVENTION

1. Field of the Invention

The present invention relates to a hybrid power system that gasifies fuel in a gasifying furnace and drives a turbine by using combustion gas generated by burning mixed gas of the gas generated in the gasifying furnace and compressed air in a gas turbine, to generate power, and boosts compressed air bled from a compressor in the gas turbine to feed the compressed air to the gasifying furnace, and a method of operating the hybrid power system.

2. Description of the Related Art

For example, a gas turbine includes a compressor, a combustor, and a turbine, in which air taken in from an air inlet port is compressed by the compressor so that compressed air with high temperature and high pressure is generated, fuel is supplied to the combustion air to be burned in the combustor, the turbine is driven by thus generated combustion gas with high temperature and high pressure, and a power generator coupled to the turbine is driven to generate power. In a hybrid power plant in which a gasifying furnace is applied to such a gas turbine, solid fuel or liquid fuel is gasified in the gasifying furnace, gas generated in the gasifying furnace is supplied to a gas turbine to be mixed with compressed air, the turbine is driven by combustion gas generated by burning the mixed gas, exhaust gas with high temperature exhausted from the gas turbine is fed to a boiler to generate steam, and generated steam is fed to a steam turbine to drive a generator and to generate power.

In such a hybrid power plant, unburned gas is generated by supplying pulverized coal (coal) as fuel, oxygen, and nitrogen in the gasifying furnace to cause imperfect combustion, and gas for combustion used in the gas turbine is purified from the unburned gas in the gasifying furnace. Compressed air for conveyance is supplied to the gasifying furnace, and unburned gas generated from the compressed air is fed to a gas purifying apparatus or the gas turbine. In a conventional hybrid power plant, compressed air bled from the compressor in the gas turbine is boosted by a booster to be fed to the gasifying furnace.

In this case, since gas for combustion cannot be immediately generated in the gasifying furnace at an activation time of the hybrid power plant, liquid fuel is supplied to the combustor instead of coal gas to activate the gas turbine. At this time, a bleed source valve provided in a bleed line extending to the booster from the compressor in the gas turbine is in a closed state. When gas for combustion is made producible in the gasifying furnace, the bleed source valve is opened to boost bled air from the compressor by the combustor and supply the same to the gasifying furnace, and coal gas is supplied to the combustor by the boosted gas to drive the gas turbine.

Japanese Patent Application Laid-Open No. H05-248260 discloses this type of hybrid power plant.

As described above, the bleed source valve is provided in the bleed line connecting the compressor in the gas turbine and the booster in the hybrid power plant, and the bleed source valve is maintained in an opened state at an activation time of the gasifying furnace. However, although the bleed source valve can be activated by hydraulic pressure, air pressure, electromagnetic force, or the like, when oil pressure leakage, air pressure leakage, or electric breakdown occurs, the bleed source valve is closed, so that surging occurs without feeding bled air to the booster, which possibly damages the booster. Therefore, when the bleed source valve is closed due to breakdown, the gas turbine and the booster are stopped immediately and the gasifying furnace is also stopped.

However, when the bleed source valve is gradually closed due to breakdown, although the gas turbine and the booster are simultaneously stopped, the booster cannot be stopped immediately due to its inertial force and a boosting operation of bled air continues by a predetermined time. On the other hand, since pressure in a casing lowers due to stoppage of the compressor in the gas turbine, compressed air of the compressor is not supplied to the booster, which causes surging in the compressor.

SUMMARY OF THE INVENTION

It is an object of the present invention to at least partially solve the problems in the conventional technology.

A hybrid power system according to one aspect of the present invention includes a gasifying furnace that gasifies solid fuel or liquid fuel; a gas turbine that drives a turbine to generate power by using combustion gas generated by burning mixed gas of compressed air compressed in a compressor and gas generated in the gasifying furnace in a combustor; a booster that boosts compressed air bled from the compressor, and feed the compressed air to the gasifying furnace; a bleed source valve that is provided in a bleed line between the compressor and the booster; and an abnormality stop controller that stops the booster and the gas turbine, based on an opening angle of the bleed source valve or a bleed pressure on an upstream side of the bleed source valve.

A method according to another aspect of the present invention is for operating a hybrid power system that includes a gasifying furnace that gasifies solid fuel or liquid fuel, a gas turbine that drives a turbine to generate power by using combustion gas generated by burning mixed gas of compressed air compressed in a compressor and gas generated in the gasifying furnace in a combustor, a booster that boosts compressed air bled from the compressor, and feed the compressed air to the gasifying furnace, and a bleed source valve that is provided in a bleed line between the compressor and the booster. The method includes determining that the bleed source valve is abnormal when a difference between an opening angle of the bleed source valve and an opening angle instruction value exceeds a predetermined reference value; stopping the booster at a time of determining that the bleed source valve is abnormal; and stopping the gas turbine after a stop delay time that is set based on a closing speed of the bleed source valve elapses.

A method according to still another aspect of the present invention is for operating a hybrid power system that includes a gasifying furnace that gasifies solid fuel or liquid fuel, a gas turbine that drives a turbine to generate power by using combustion gas generated by burning mixed gas of compressed air compressed in a compressor and gas generated in the gasifying furnace in a combustor, a booster that boosts compressed air bled from the compressor, and feed the compressed air to the gasifying furnace, and a bleed source valve that is provided in a bleed line between the compressor and the booster. The method includes determining that the bleed source valve is abnormal when a bleed pressure on an upstream side of the bleed source valve exceeds a predetermined pressure upper-limit value, and stopping the booster and the gas turbine at a time of determining that the bleed source valve is abnormal.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments according to the present invention will be explained in detail below with reference to the accompanying drawings. The present invention is not limited to the embodiments.

Figure 1:
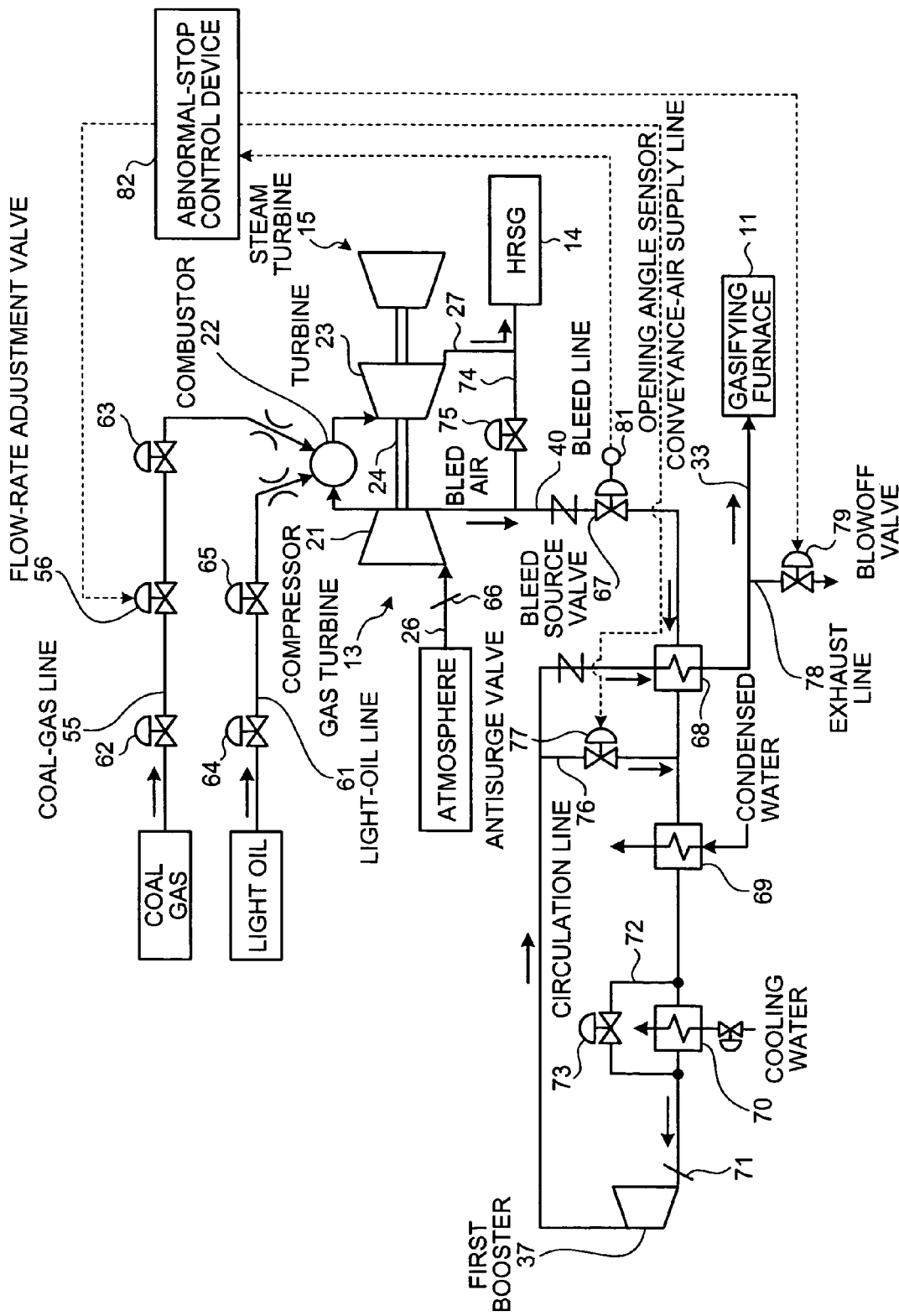
FIG. 1 is a schematic diagram of a fuel supply line and a bleed line of a gas turbine in a hybrid power system according to a first embodiment of the present invention.
Figure 2:
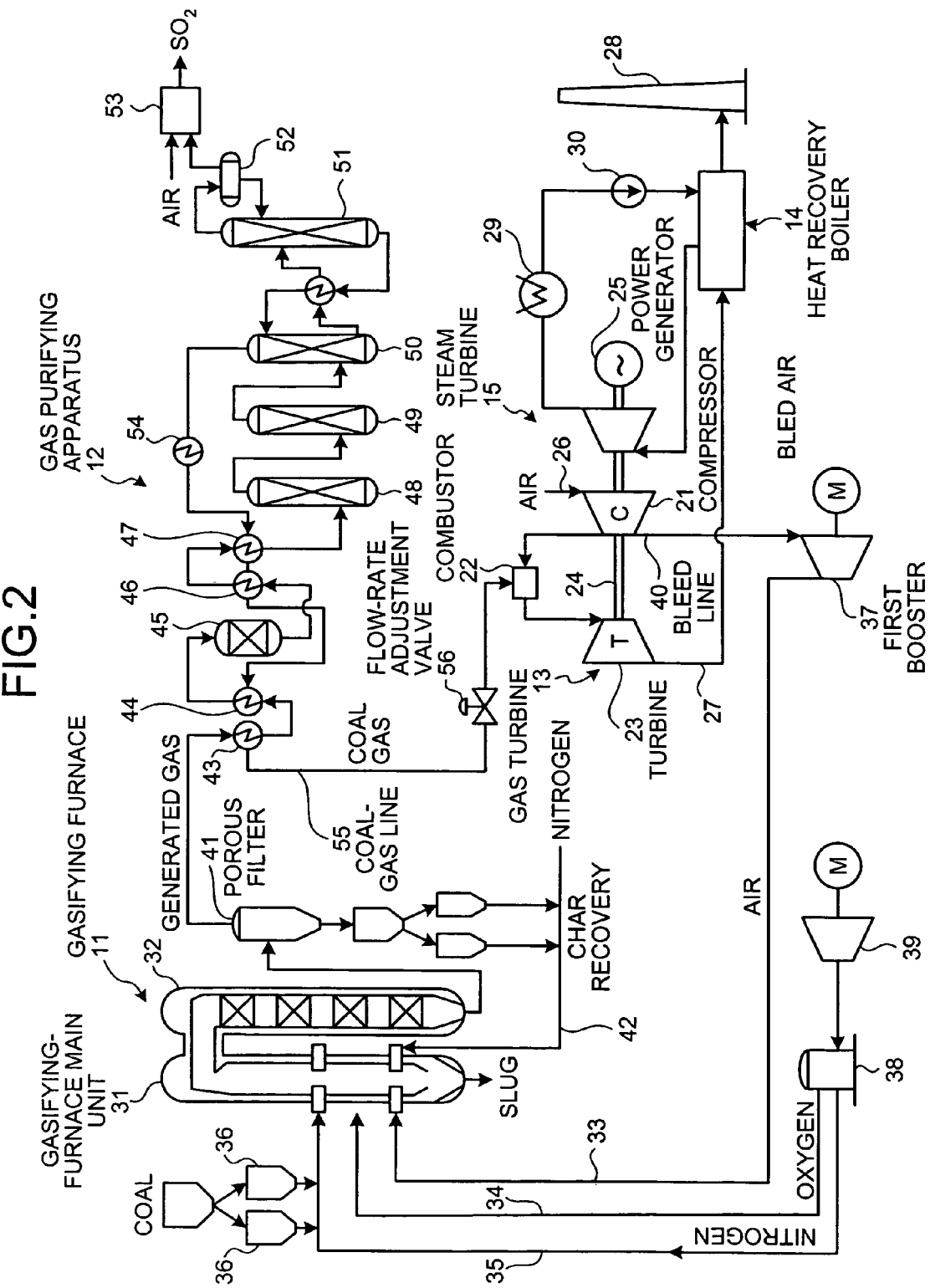
FIG. 2 is a schematic configuration diagram of the hybrid power system according to the first embodiment.
Figure 3:
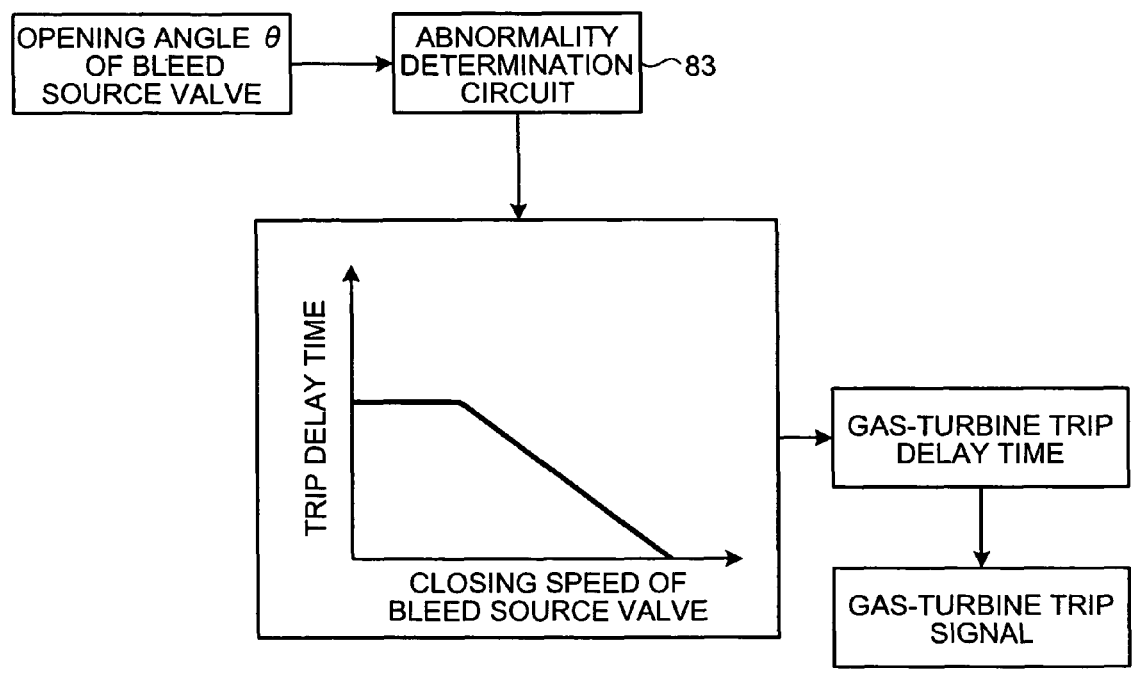
FIG. 3 is a control block diagram of abnormality determination processing of a bleed source valve in the hybrid power system according to the first embodiment.
Figure 4:
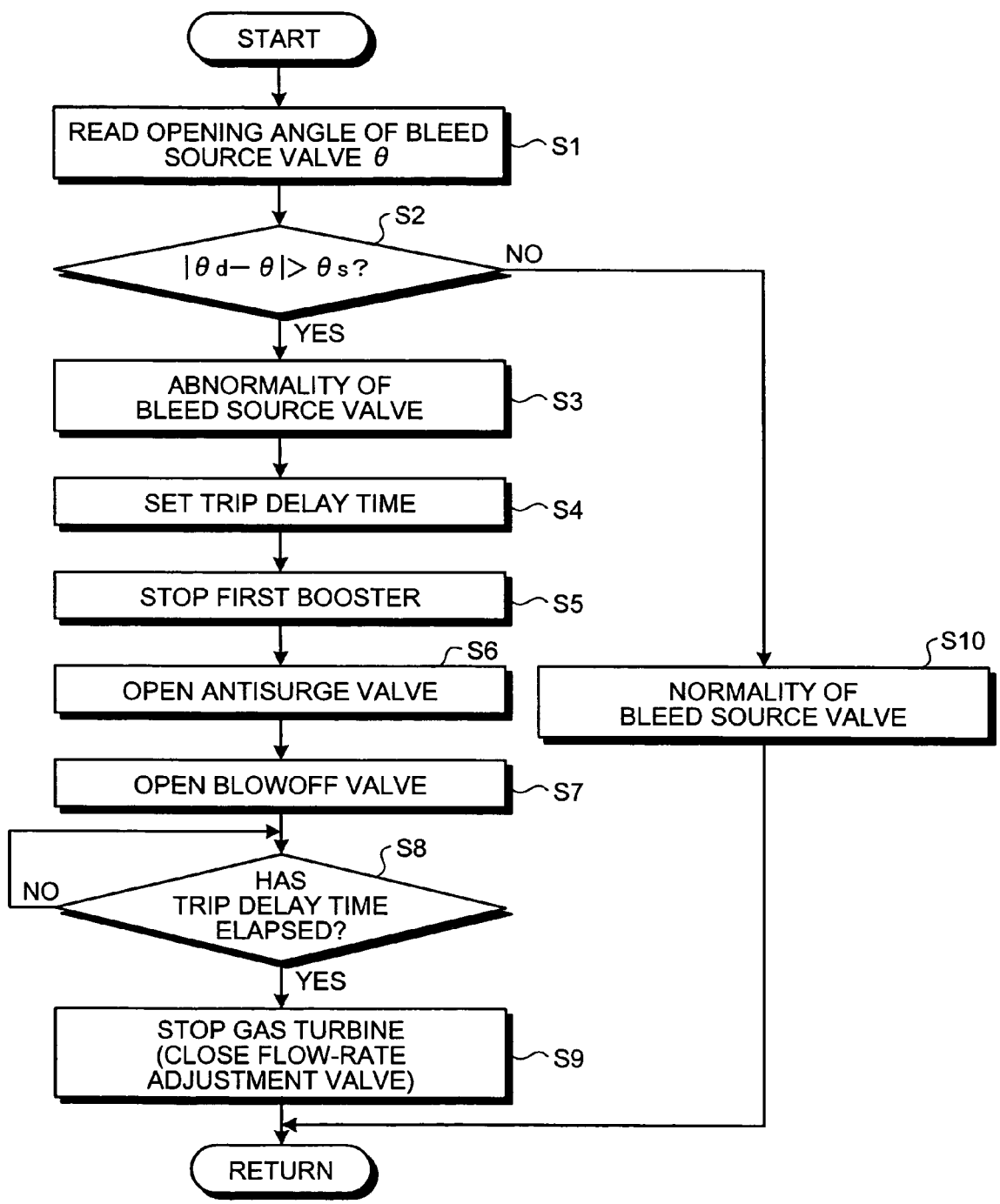
FIG. 4 is a flowchart of abnormality determination control of the bleed source valve in the hybrid power system according to the first embodiment.

FIG. 1 is a schematic diagram of a fuel supply line and a bleed line of a gas turbine in a hybrid power system according to a first embodiment of the present invention. FIG. 2 is a schematic configuration diagram of the hybrid power system according to the first embodiment. FIG. 3 is a control block diagram of abnormality determination processing of a bleed source valve in the hybrid power system according to the first embodiment. FIG. 4 is a flowchart of abnormality determination control of the bleed source valve in the hybrid power system according to the first embodiment.

As shown in FIG. 2, the hybrid power system according to the first embodiment includes a gasifying furnace 11, a gas purifying apparatus 12, a gas turbine 13, a heat recovery boiler (heat recovery steam generator (HRSG)) 14, and a steam turbine 15. The gas turbine 13 has a compressor 21, a combustor 22, and a turbine 23 in which the compressor 21 and the turbine 23 are coupled via a turbine shaft 24. The steam turbine 15 is coupled to the gas turbine 13 coaxially with the turbine shaft 24, and a power generator 25 is coupled to an end portion of the turbine shaft 24. An air intake line 26 for taking in air is coupled to an inlet side of the compressor 21 in the gas turbine 13, while an exhaust line 27 is coupled to an outlet side of the turbine 23.

The exhaust line 27 of the gas turbine 13 is coupled to a chimney 28 via the heat recovery boiler 14. The heat recovery boiler 14 has a high pressure boiler, a middle pressure boiler, and a low pressure boiler, for example, and steam can be generated in the respective boilers utilizing exhaust gas from the gas turbine 13. The steam turbine 15 can be driven according to supply of steam generated in the heat recovery boiler 14 to operate the power generator 25 coupled thereto. After steam supplied to the steam turbine 15 is fed to a condenser 29 to be condensed, condensed water is fed to the heat recovery boiler 14 by a condensed water pump 30.

The gasifying furnace 11 is used for imperfectly burning pulverized coal (coal) as solid fuel to produce unburned gas (such as $H_2$, $CO$, $CO_2$, and $N_2$), and the gas purifying apparatus 12 is used for performing purifying processing or the like to the unburned gas generated in the gasifying furnace 11 to remove impurities and purify coal gas. That is, the gasifying furnace 11 includes a gasifying-furnace main unit 31 and a heat exchanger (a cooling column) 32 provided adjacent to each other. A conveyance-air supply line 33, an oxygen supply line 34, and a nitrogen supply line 35 are connected to the gasifying-furnace main unit 31, and supply hoppers 36 for feeding pulverized coal is provided to the nitrogen supply line 35. The conveyance-air supply line 33 is connected at its proximal end with a first booster 37, the oxygen supply line 34 and the nitrogen supply line 35 are connected at their proximal ends with an air separating device 38 and a second booster 39, and a bleed line 40 extending from the compressor 21 in the gas turbine 13 is connected to the first booster 37.

A porous filter 41 serving as a char recovery device is coupled to the heat exchanger 32, and char (mainly including fixed carbon and ash content) recovered in the porous filter 41 is returned back to the gasifying-furnace main unit 31 from a char recovery line 42 by nitrogen. The gas purifying apparatus 12 has first and second gas-gas heaters 43 and 44, a carbon oxysulfide (COS) converter 45, third and fourth gas-gas heaters 46 and 47, a gas cooling column 48, a gas cleaning column 49, a hydrogen sulfide ($H_2S$) absorbing column 50, an absorbing agent regenerating column 51, an $H_2S$ combustion furnace 52, a desulfurizing device 53, and a heat exchanger 54. Accordingly, unburned gas generated in the gasifying furnace 11 is caused to pass through the respective devices in the gas purifying apparatus 12 so that sulfur content compound, nitrogen compound, and other noxious substances can be removed by heat of the unburned gas itself.

A coal-gas line 55 that supplies coal gas from the gas purifying apparatus 12 to the combustor 22 in the gas turbine 13 is provided, and a flow-rate adjustment valve 56 for adjusting a supply amount of coal gas is provided in the coal-gas line 55.

An operation of the hybrid power plant described above will be explained. In the gasifying furnace 11, oxygen is supplied from the oxygen supply line 34 to the gasifying-furnace main unit 31 and nitrogen and pulverized coal, are supplied from the nitrogen supply line 35 to the gasifying-furnace main unit 31 so that the pulverized coal is burned and unburned gas is generated inside the gasifying-furnace main unit 31. The unburned gas is fed to the heat exchanger 32 by conveyance air fed from the conveyance-air supply line 33 to the gasifying-furnace main unit 31, it is cooled therein and char is removed from the gas by the porous filter 41. Thereafter, sulfur content compound, nitrogen compound, and other noxious substances are removed from the unburned gas in the gas purifying apparatus 12, so that coal gas is purified.

In the gas turbine 13, air taken into the compressor 21 through the air intake line 26 is compressed so that compressed air with high temperature and high pressure is generated, the compressed air is fed to the combustor 22, and the coal gas purified in the gas purifying apparatus 12 is fed to the combustor 22 from the coal-gas line 55, where mixed gas of the compressed air and the coal gas is ignited and burned. Combustion gas with high temperature and high pressure generated in the combustor 22 is fed to the turbine 23 to pass through a plurality of stator vanes and rotor vanes (not shown), thereby rotationally driving the turbine shaft 24. Exhaust gas exhausted from the turbine 23 is fed to the heat recovery boiler 14 via the exhaust line 27, where steam is generated by exhaust gas with high temperature and high pressure. Steam generated in the boiler is fed to the steam turbine 15 to drive the same, thereby rotationally driving the power generator 25 to generate power. After steam fed to the steam turbine 15 is condensed in the condenser 29, condensed water is returned back to the heat recovery boiler 14 by the condensed water pump 30.

In the hybrid power plant thus configured, as described above, pulverized coal is burned to produce unburned gas in the gasifying furnace 11, compressed air bled from the compressor 21 in the gas turbine 13 is boosted by the first booster 37, and the boosted gas is supplied from the conveyance-air supply line 33 to the gasifying furnace 11, so that unburned gas in the gasifying furnace 11 is fed to the gas purifying apparatus 12 where the gas is purified and the purified coal gas is fed to the gas turbine 13. However, since unburned gas (coal gas) cannot be generated in the gasifying furnace 11 immediately at an activation time of the hybrid power plant, liquid fuel (light oil) is supplied to the combustor 22 instead of the coal gas at the activation time of the gas turbine 13. At this time, the bleed line 40 extending from the compressor 21 of the gas turbine 13 to the first booster 37 is closed and bleeding of compressed air from the compressor 21 is stopped. When unburned gas (coal gas) becomes producible in the gasifying furnace 11, the bleed line 40 is opened, compressed air bled from the compressor 21 is boosted by the first booster 37, and the boosted air is fed to the gasifying furnace 11, so that coal gas is supplied to the gas turbine 13.

That is, as shown in FIG. 1, the coal-gas line 55 that supplies coal gas to the combustor 22 in the gas turbine 13 and a light-oil line 61 that supplies light oil thereto are provided, and a pressure adjustment valve 62, the flow-rate adjustment valve 56, and an over-rate blocking valve 63 are provided in the coal-gas line 55, while a pressure adjustment valve 64 and a flow-rate adjustment valve 65 are provided in the light-oil line 61. The air intake line 26 that takes the atmospheric air into the compressor 21 in the gas turbine 13 is provided and an inlet guide vane (IGV) 66 is provided in the air intake line 26.

On the other hand, a bleed source valve 67, first to third bled air coolers 68, 69 and 70, and an IGV 71 are provided in the bleed line 40 extending from the compressor 21 in the gas turbine 13 to the first booster 37. In the first bled air cooler 68, heat exchange (cooling) between bled air and boosted air can be performed by crossing the conveyance-air supply line 33 extending from the first booster 37 to the gasifying furnace 11 and the bleed line 40 with each other. The second bled air cooler 69 can be cooled by condensed water from the condenser 29 in the steam turbine 15. The third bled air cooler 70 can be cooled by cooling water (seawater). A cooler bypass line 72 is provided corresponding to the third bled air cooler 70, and a bypass valve 73 is provided in the cooler bypass line 72. A bleed bypass line 74 connected to the exhaust line 27 branched from the bleed line 40 is provided and a bypass valve 75 is provided in the bleed bypass line 74.

A circulation line 76 extending from an upstream side of the first bled air cooler 68 to the first and the second bled air coolers 68 and 69 in the bleed line 40 is provided utilizing the conveyance-air supply line 33 extending from the first booster 37 to the gasifying furnace 11. An antisurge valve 77 is provided in the circulation line 76. An exhaust line 78 branched from a downstream side of the first bled air cooler 68 in the conveyance-air supply line 33 to communicate with the atmosphere is provided and a blowoff valve 79 is provided in the exhaust line 78.

As shown in FIGS. 1 and 2, oxygen is supplied from the oxygen supply line 34 to the gasifying-furnace main unit 31, and nitrogen and pulverized coal are supplied from the nitrogen supply line 35 thereto in the gasifying furnace 11 at an activation time of the hybrid power plant, where the pulverized coal is burned to produce unburned gas. At this time, however, since unburned gas cannot be purified immediately, supply of boosted air to the gasifying furnace 11 through the conveyance-air supply line 33 conducted by the first booster 37 is stopped and supply of coal gas to the gas turbine 13 is stopped.

That is, bleeding of compressed air from the compressor 21 is stopped by closing the bleed source valve 67 to close the bleed line 40. The bleed line 40 and the conveyance-air supply line 33 are put in a looped state through the circulation line 76 by activating the first booster 37 and opening the antisurge valve 77, so that sufficient air to the first booster 37 is secured and occurrence of surging is prevented. Supply of air to the gasifying furnace 11 is stopped by opening the blowoff valve 79 to open the exhaust line 78.

On the other hand, in the gas turbine 13, light oil is supplied from the light-oil line 61 to the combustor 22 in the gas turbine 13 by closing the flow-rate adjustment valve 56 in the coal-gas line 55 while opening the pressure adjustment valve 64 and the flow-rate adjustment valve 65 of the light-oil line 61 by predetermined angles. Air taken into the compressor 21 via the air intake line 26 is compressed so that compressed air with high temperature and high pressure is generated, and the compressed air is fed to the combustor 22 and light oil is sent and jetted into the combustor 22 from the light-oil line 61 so that mixed gas obtained by mixing light oil with compressed air is formed and the mixed gas is ignited and burned.

Thereafter, when unburned gas becomes producible in the gasifying furnace 11 after a predetermined time elapses, supply of boosted air to the gasifying furnace 11 via the conveyance-air supply line 33 conducted by the first booster 37 is started and supply of coal gas to the gas turbine 13 is started. That is, bleeding of compressed air from the compressor 21 is performed by opening the bleed source valve 67 to open the bleed line 40. The circulation line 76 is cut by closing the antisurge valve 77 so that the looping state formed by the bleed line 40 and the conveyance-air supply line 33 is released. The exhaust line 78 is closed by closing the blowoff valve 79 so air can be supplied to the gasifying furnace 11. Thus, compressed air in the compressor 21 is supplied to the first booster 37 via the bleed line 40, the compressed air is boosted in the first booster 37, and the boosted air is supplied to the gasifying-furnace main unit 31 via the conveyance-air supply line 33, so that unburned gas generated in the gasifying furnace 11 is supplied to the gas purifying apparatus 12 where coal gas can be purified.

On the other hand, in the gas turbine 13, supply of light oil is stopped to the combustor 22 in the gas turbine 13 by closing the flow-rate adjustment valve 65 in the light-oil line 61, while supply of coal gas from the coal-gas line 55 is started by opening the pressure adjustment valve 62 and the flow-rate adjustment valve 56 in the coal-gas line 55 by predetermined angles and opening the over-rate blocking valve 63. Thus, air taken into the compressor 21 via the air intake line 26 is compressed so that compressed air with high temperature and high pressure is generated, the compressed air is supplied to the combustor 22, and coal gas is simultaneously fed to the combustor 22 via the coal-gas line 55 so that mixed gas generated by mixing the coal gas with the compressed air is formed and the mixed gas is ignited and burned.

In the hybrid power plant, by feeding coal gas generated in the gasifying furnace 11 and the gas purifying apparatus 12 from the coal-gas line 55 to the gas turbine 113 to burn the same while bleeding compressed air from the compressor 21 in the gas turbine 13 and boosting the same in the first booster 37 to feed the boosted air to the gasifying furnace 11, the boosted air is used as conveyance air of coal gas. That is, at this time, the bleed source valve 67 provided in the bleed line 40 is kept in its opened state.

However, the bleed source valve 67 can be operated by hydraulic pressure or air pressure, and when breakdown such as oil pressure leakage or air pressure leakage occurs, the bleed source valve 67 is closed, so that surging is caused without feeding compressed air to the first booster 37. In this embodiment, therefore, when the bleed source valve 67 is closed due to breakdown, the gas turbine 13 and the first booster 37 are stopped immediately and the gasifying furnace 11, the gas purifying apparatus 12, and the like are stopped. In this case, when the bleed source valve 67 is gradually closed due to breakdown, even if the gas turbine 13 and the first booster 37 are stopped immediately, the first booster 37 continues to operate by only a predetermined time due to its inertial force. In this embodiment, therefore, the time at which the gas turbine 13 is stopped is delayed according to an opening angle of the bleed source valve 67.

That is, as shown in FIGS. 1 and 3, an opening angle sensor 81 that detects an opening angle of the bleed source valve 67 is provided at the bleed source valve 67, the opening angle sensor 81 outputs a detected opening angle of the bleed source valve 67 to an abnormal-stop control device 82, and the abnormal-stop control device 82 stops the first booster 37 and the gas turbine 13 according to the opening angle of the bleed source valve 67.

Specifically, the abnormal-stop control device 82 has an abnormality determination circuit (an abnormality determining unit) 83, and the abnormality determination circuit 83 determines whether the bleed source valve 67 is abnormal based on a deviation between an opening angle θ of the bleed source valve 67 detected by the opening angle sensor 81 and an opening angle instruction value θd set according to an operating state of the hybrid power plant. When the abnormality determination circuit 83 determines that the bleed source valve 67 is abnormal, the abnormal-stop control device 82 stops the first booster 37 and sets a trip delay time (stop delay time) of the gas turbine 13 according to a closing speed of the bleed source valve 67, thereby stopping the gas turbine 13 after the trip delay time elapses.

In this case, the abnormal-stop control device 82 has a map of the trip delay time to the closing speed of the bleed source valve 67 in advance. The map is used for setting the trip delay time to be shorter according to increase of the closing speed of the bleed source valve 67. However, the trip delay time in the map is set to be constant in a range where the closing speed of the bleed source valve 67 is a predetermined speed or less in consideration of safety. Accordingly, the abnormal-stop control device 82 continuously reads the opening angle θ of the bleed source valve 67 detected by the opening angle sensor 81 to calculate the closing speed of the bleed source valve 67, sets the trip delay time according to the closing speed of the bleed source valve 67 calculated using the map, and outputs a trip signal for stopping the gas turbine 13 after the trip delay time elapses.

When the abnormality determination circuit 83 determines that the bleed source valve 67 is abnormal, the abnormal-stop control device 82 stops the first booster 37 and opens the antisurge valve 77 to put the bleed line 40 and the conveyance-air supply line 33 in a looped state through the circulation line 76. The abnormal-stop control device 82 further opens the blowoff valve 79 to open the exhaust line 78.

Abnormality determination control of the bleed source valve 67 performed by the abnormal-stop control device 82 will be explained with reference to a flowchart shown in FIG. 4.

In the abnormality determination control of the bleed source valve 67 in the hybrid power plant according to the embodiment, as shown in FIG. 4, the abnormal-stop control device 82 reads an opening angle θ of the bleed source valve 67 detected by the opening angle sensor 81 at step S1 and determines whether an absolute value of a deviation between the opening angle θ of the bleed source valve 67 and the opening angle instruction value θd is larger than an opening angle threshold (for example, 10% of the opening angle instruction value θd) θs at step S2. Upon determining that the absolute value of the deviation between the opening angle θ of the bleed source valve 67 and the opening angle instruction value θd is larger than the opening angle threshold θs at step S2, the abnormal-stop control device 82 determines that the opening angle θ of the bleed source valve 67 with respect to the opening angle threshold θd is small and the bleed source valve 67 is put in a closed state and determines that the bleed source valve 67 is abnormal at step S3. On the other hand, upon determining that the absolute value of the deviation between the opening angle θ of the bleed source valve 67 and the opening angle instruction value θd is not larger than the opening angle threshold θs, the abnormal-stop control device 82 determines that the bleed source valve 67 is normal at step S10.

Upon determining that the bleed source valve 67 is abnormal at step S3, the abnormal-stop control device 82 sets a trip delay time at step S4. That is, the abnormal-stop control device 82 calculates a closing speed from the opening angle θ of the bleed source valve 67 and sets the trip delay time according to the closing speed of the bleed source valve 67 using the map. The abnormal-stop control device 82 stops the first booster 37 at step S5, opens the antisurge valve 77 at step S6, and opens the blowoff valve 79 at step S7. Subsequently, the abnormal-stop control device 82 determines whether the trip delay time has elapsed after determination of abnormality of the bleed source valve 67 at step S8 and closes the flow-rate adjustment valve 56 of the coal-gas line 55 at step S9 to stop the gas turbine 13 when the trip delay time has elapsed. Upon determining that the bleed source valve 67 is abnormal, the abnormal-stop control device 82 also stops the gasifying furnace 11, the gas purifying apparatus 12, the heat recovery boiler 14, the steam turbine 15, and the like.

Accordingly, upon detecting abnormality of the bleed source valve 67, the abnormal-stop control device 82 stops the first booster 37 and then stops the gas turbine 13 after the trip delay time corresponding to the closing speed of the bleed source valve 67 has elapsed, so that air can be continuously supplied to the first booster 37 which is operating according to an inertial force and occurrence of surging of the first booster 37 can be prevented. At this time, the bleed line 40 and the conveyance-air supply line 33 are put in a looped state through the circulation line 76 by opening the antisurge valve 77, and sufficient air is securely supplied to the first booster 37 by circulating a small amount of air having passed through the bleed source valve 67 so that occurrence of the surging can be suppressed. Supply of air to the stopped gasifying furnace 11 is stopped by opening the blowoff valve 79 to open the exhaust line 78.

Thus, in the hybrid power system of the first embodiment, the gasifying furnace 11 that burns pulverized coal (coal gas) to gasify the same, the gas purifying apparatus 12 that removes noxious substances from unburned gas generated in the gasifying furnace 11 to purify coal gas, and the gas turbine 13 that drives the turbine 23 by combustion gas generated by burning, in the combustor 22, mixed gas of compressed air compressed in the compressor 21 and coal gas generated in the gasifying furnace 11 and the gas purifying apparatus 12 to generate power by the power generator 25 are provided. Therefore, compressed air bled from the compressor 21 through the bleed line 40 can be boosted by the first booster 37 to be fed to the gasifying furnace 11. Since the bleed source valve 67 is provided in the bleed line 40, the abnormal-stop control device 82 can stop the first booster 37 and the gas turbine 13 according to the opening angle of the bleed source valve 67.

Accordingly, since the abnormal-stop control device 82 can determine abnormality of the bleed source valve 67 according to the opening angle of the bleed source valve 67 to set stop timings of the first booster 37 and the gas turbine 13, surging of the first booster 37 due to breakdown of the bleed source valve 67 can be suppressed to improve safety.

In this case, in the embodiment, the opening angle sensor 81 that detects the opening angle of the bleed source valve 67 is provided, the abnormality determination circuit 83 determines that the bleed source valve 67 is abnormal when the absolute value of the deviation between the opening angle θ detected by the opening angle sensor 81 and the opening angle instruction value θs is larger than the opening angle threshold θd, the abnormal-stop control device 82 stops the first booster 37 and sets a trip delay time corresponding to the closing speed of the bleed source valve 67, and the abnormal-stop control device 82 stops the gas turbine 13 after the trip delay time has elapsed. Accordingly, the abnormal-stop control device 82 stops the first booster 37 and stops the gas turbine 13 after the trip delay time has elapsed at an abnormal time of the bleed source valve 67, so that air shortage in the first booster 37 can be prevented and surging can be suppressed reliably.

In the hybrid power system according to the first embodiment, the circulation line 76 that returns air exhausted from the first booster 37 back to the inlet side of the first booster is provided and the antisurge valve 77 is provided in the circulation line 76, and the abnormal-stop control device 82 opens the circulation line by the antisurge valve 77 at an abnormal time of the bleed source valve 67. Accordingly, air exhausted from the first booster 37 is returned back to the inlet side through the circulation line 76 at an abnormal time of the bleed source valve 67, so that air shortage in the first booster 37 can be prevented and surging can be suppressed reliably.

In the hybrid power system according to the first embodiment, the exhaust line 78 that exhausts air exhausted from the first booster 37 to the atmosphere is provided and the blowoff valve 79 is provided in the exhaust line 78, and the abnormal-stop control device 82 opens the exhaust line 78 by the blowoff valve 79 at an abnormal time of the bleed source valve 67. Accordingly, air exhausted from the first booster 37 is exhausted to the atmosphere through the exhaust line 78 at an abnormal time of the bleed source valve 67, so that air shortage in the first booster 37 can be prevented and surging can be suppressed reliably.

Figure 5:
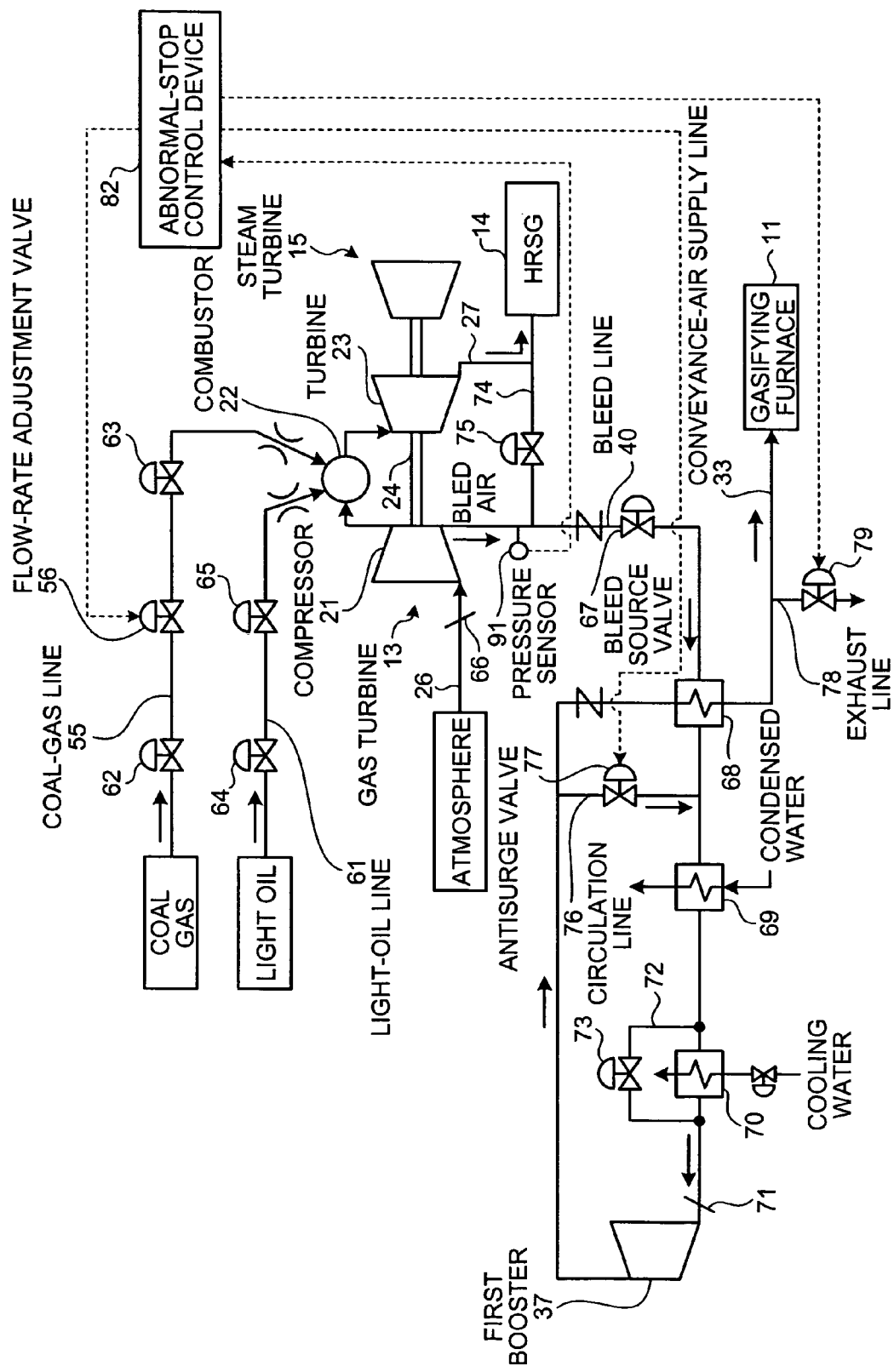
FIG. 5 is a schematic diagram of a fuel supply line and a bleed line of a gas turbine in a hybrid power system according to a second embodiment of the present invention.
Figure 6:
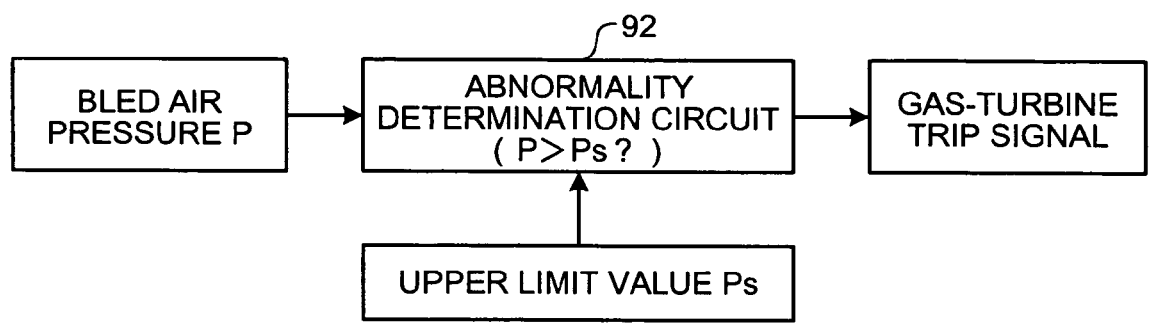
FIG. 6 is a control block diagram of abnormality determination processing of a bleed source valve in the hybrid power system according to the second embodiment.
Figure 7:
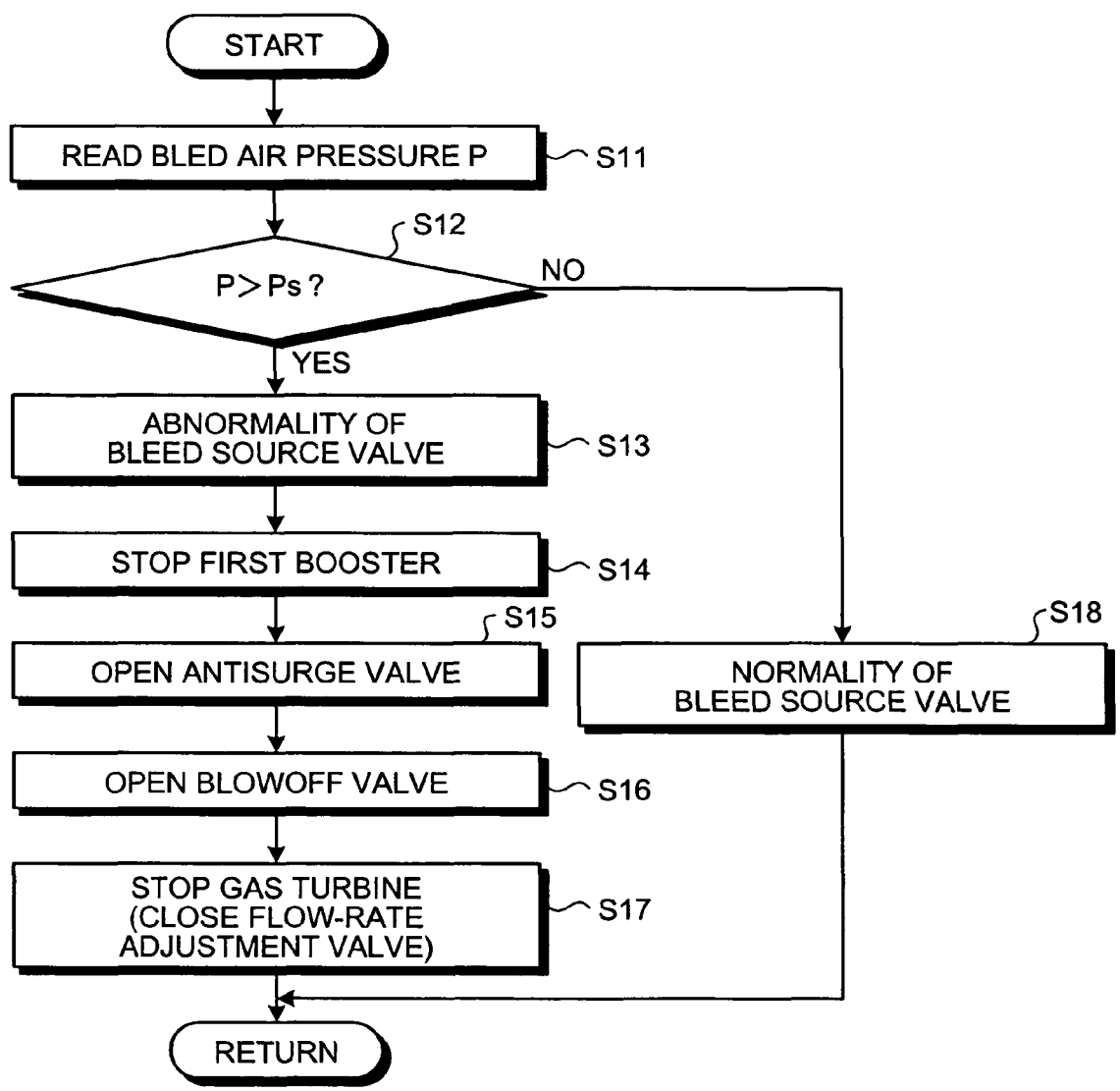
FIG. 7 is a flowchart of abnormality determination control of the bleed source valve in the hybrid power system according to the second embodiment.

FIG. 5 is a schematic diagram of a fuel supply line and a bleed line of a gas turbine in a hybrid power system according to a second embodiment of the present invention. FIG. 6 is a control block diagram of abnormality determination processing of a bleed source valve in the hybrid power system according to the second embodiment. FIG. 7 is a flowchart of abnormality determination control of the bleed source valve in the hybrid power system according to the second embodiment. Like reference numerals denote like parts having functions similar to those explained in the first embodiment and redundant explanation thereof is omitted.

In the hybrid power system according to the second embodiment, as shown in FIG. 5, when the bleed source valve 67 is closed due to breakdown, the gas turbine 13 and the first booster 37 are stopped immediately, and the gasifying furnace 11, the gas purifying apparatus 12, and the like are stopped. In this case, when the bleed source valve 67 is gradually closed due to breakdown, even if the gas turbine 13 and the first booster 37 are stopped immediately, the first booster 37 continues to operate by a predetermined time due to its inertial force. In this embodiment, the gas turbine 13 is stopped according to a bleed pressure on the upstream side of the bleed source valve 67.

That is, as shown in FIGS. 5 and 6, since a pressure sensor 91 that detects a pressure of bled compressed air (hereinafter, "bled air pressure") is provided on the upstream side of the bleed source valve 67 in the bleed line 40, and the pressure sensor 91 outputs the detected bled air pressure of the bleed line 40 to the abnormal-stop control device 82, the abnormal-stop control device 82 can stop the first booster 37 and the gas turbine 13 according to the bled air pressure of the bleed line 40.

Specifically, the abnormal-stop control device 82 has an abnormality determination circuit (abnormality determining unit) 92 that determines whether the bleed source valve 67 is abnormal based on a deviation between a bled air pressure P flowing in the bleed line 40 and detected by the pressure sensor 91 and an upper-limit value Ps set so as to correspond to an operating state of the hybrid power plant. When the abnormality determination circuit 92 determines that the bleed source valve 67 is abnormal, the abnormal-stop control device 82 stops the first booster 37 and the gas turbine 13.

When the abnormality determination circuit 92 determines that the bleed source valve 67 is abnormal, the abnormal-stop control device 82 stops the first booster 37 and simultaneously opens the antisurge valve 77 to put the bleed line 40 and the conveyance-air supply line 33 in a looped state through the circulation line 76. The abnormal-stop control device 82 further opens the blowoff valve 79 to open the exhaust line 78.

Abnormality determination control of the bleed source valve 67 performed by the abnormal-stop control device 82 described above will be explained with reference to the flowchart shown in FIG. 7.

In the abnormality determination control of the bleed source valve 67 in the hybrid power plant according to the second embodiment, as shown in FIG. 7, the abnormal-stop control device 82 reads a bled air pressure P of the bleed line 40 detected by the pressure sensor 91 at step S11 and determines whether the bled air pressure P is higher than the upper-limit value Ps at step S12. Upon determining that the bled air pressure P is higher than the upper-limit value Ps at step S12, the abnormal-stop control device 82 determines that the pressure on the upstream side of the bleed source valve 67 in the bleed line 40 is high and the bleed source valve 67 is put in a closed state, and determines that the bleed source valve 67 is abnormal at step S13. On the other hand, upon determining that the bled air pressure P is not higher than the upper-limit value Ps, the abnormal-stop control device 82 determines that the bleed source valve 67 is normal at step S18.

Upon determining that the bleed source valve 67 is abnormal at step S13, the abnormal-stop control device 82 stops the first booster 37 at step S14, opens the antisurge valve 77 at step S15, and opens the blowoff valve 79 at step S16. Subsequently, the abnormal-stop control device 82 closes the flow-rate adjustment valve 56 of the coal-gas line 55 to stop the gas turbine 13 at step S17. Upon determining that the bleed source valve 67 is abnormal, the abnormal-stop control device 82 also stops the gasifying furnace 11, the gas purifying apparatus 12, the heat recovery boiler 14, the steam turbine 15, and the like.

Accordingly, when abnormality of the bleed source valve 67 is detected, the abnormal-stop control device 82 stops the first booster 37 and the gas turbine 13 in a state in which the bled air pressure is high, so that air can be continuously supplied to the first booster 37 which is operating according to an inertial force and occurrence of surging of the first booster 37 can be prevented. At this time, the bleed line 40 and the conveyance-air supply line 33 are put in a looped state through the circulation line 76 by opening the antisurge valve 77 and sufficient air is securely supplied to the first booster 37 by circulating a small amount of air having passed through the bleed source valve 67 so that occurrence of the surging can be suppresses. Supply of air to the stopped gasifying furnace 11 is stopped by opening the blowoff valve 79 to open the exhaust line 78.

Thus, in the hybrid power system according to the second embodiment, the pressure sensor 91 that detects a bled air pressure P on the upstream side of the bleed source valve 67 in the bleed line 40 is provided, the abnormality determination circuit 92 determines that the bleed source valve 67 is abnormal when the bled air pressure P detected by the pressure sensor 91 is higher than the upper limit valve Ps, and the abnormal-stop control device 82 stops the first booster 37 and stops the gas turbine 13.

Accordingly, since the abnormal-stop control device 82 stops the first booster 37 and the gas turbine 13 in a state in which the bled air pressure P on the upstream side of the bleed source valve 67 is higher than the upper limit valve Ps at an abnormal time of the bleed source valve 67, even if the gas turbine 13 is stopped, bleeding of air from the compressor 21 to the first booster 37 is possible so that air shortage in the first booster 37 can be prevented and surging can be suppressed reliably.

According to the second embodiment, the pressure sensor 91 that detects the bled air pressure P on the upstream side of the bleed source valve 67 in the bleed line 40 is provided. However, the mounting position thereof is not limited to the embodiment. The pressure sensor 91 can be provided at any position between the compressor in the gas turbine 13 and the bleed source valve 67 of the bleed line 40, and it can be provided in the casing of the compressor 21.

In the respective embodiments described above, while the gasifying furnace 11, the gas purifying apparatus 12, the gas turbine 13, the heat recovery boiler 14, and the steam turbine 15 constitute the hybrid power system, the present invention is not limited to this configuration. For example, an exhaust reheat boiler, a supercharged boiler, a feedwater heating boiler, or the like can be used instead of the heat recovery boiler 14.

As describe above, according to an embodiment of the present invention, the gasifying furnace that gasifies solid fuel or liquid fuel, the gas turbine that drives a turbine to generate power by combustion gas generated by burning mixed gas of compressed air compressed in a compressor and gas generated in the gasifying furnace in a combustor, and the booster that boosts compressed air bled from the compressor to feed the compressed air to the gasifying furnace are provided, the bleed source valve is provided in the bleed line between the compressor and the booster, and the abnormality stop controller that stops the booster and the gas turbine according to an opening angle of the bleed source valve or a bleed pressure on an upstream side of the bleed source valve is provided. Therefore, the abnormality stop controller can determine whether the bleed source valve is abnormal according to the opening angle of the bleed source valve or the bleed pressure on the upstream side of the bleed source valve to set stop timing of the booster and the gas turbine, thereby suppressing surging of the booster at a breakdown time of the bleed source valve, and improving safety Furthermore, according to an embodiment of the present invention, the opening angle sensor that detects an opening angle of the bleed source valve and the abnormality determining unit that determines whether the bleed source valve is abnormal based on a deviation between the opening angle detected by the opening angle sensor and an opening angle instruction value are provided, the abnormality stop controller stops the booster and sets a stop delay time according to a closing speed of the bleed source valve when the abnormality determining unit determines that the bleed source valve is abnormal, and the abnormality stop controller stops the gas turbine after the stop delay time elapses. Therefore, the abnormality stop controller stops the booster at an abnormality time of the bleed source valve and stops the gas turbine after the stop delay time elapses, thereby preventing air shortage in the booster, and reliably suppressing surging of the booster.

Moreover, according to an embodiment of the present invention, the pressure sensor that detects the bleed pressure on the upstream side of the bleed source valve and the abnormality determining unit that determines that the bleed source valve is abnormal when a pressure detected by the pressure sensor exceeds a pressure upper-limit value preliminarily set are provided, and the abnormality stop controller stops the booster and the gas turbine when the abnormality determining unit determines that the bleed source valve is abnormal. Therefore, the abnormality stop controller stops the booster and the gas turbine in a state in which a bleed pressure on the upstream side of the bleed source valve has exceeded a pressure upper limit valve at an abnormality time of the bleed source valve, thereby preventing air shortage in the booster, and reliably suppressing surging of the booster.

Furthermore, according to an embodiment of the present invention, the circulation line that returns boosted air exhausted from the booster back to an inlet side of the booster is provided and the abnormality stop controller opens the circulation line when the abnormality determining unit determines that the bleed source valve is abnormal. Therefore, the abnormality stop controller returns boosted air exhausted from the booster to the inlet side via the circulation line at an abnormality time of the bleed source valve, thereby preventing air shortage in the booster, and reliably suppressing surging of the booster.

Moreover, according to an embodiment of the present invention, the exhaust line that exhausts boosted air exhausted from the booster to the atmosphere is provided, and when the abnormality determining unit determines that the bleed source valve is abnormal, the abnormality stop controller opens the exhaust line. Therefore, the abnormality stop controller exhausts boosted air exhausted from the booster to the atmosphere via the exhaust line at an abnormality time of the bleed source valve, thereby preventing air shortage in the booster, and reliably suppressing surging of the booster.

Furthermore, according to an embodiment of the present invention, the bleed source valve is determined as abnormal when the deviation between the opening angle of the bleed source valve and the opening angle instruction value exceeds the reference value preliminarily set, the booster is stopped at an abnormality determination time of the bleed source valve, and the gas turbine is stopped after the stop delay time preliminarily set according to the closing speed of the bleed source valve elapses. Therefore, air shortage in the booster is prevented at the abnormality time of the bleed source valve so that surging of the booster can be suppressed reliably.

Moreover, according to an embodiment of the present invention, the bleed source valve is determined as abnormal when the bleed pressure on the upstream side of the bleed source valve exceeds the pressure upper-limit value preliminarily set, and the booster and the gas turbine are stopped at the abnormality determination time of the bleed source valve. Therefore, air shortage in the booster is prevented at the abnormality time of the bleed source valve so that surging of the booster can be suppressed reliably.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A hybrid power system, comprising:
   a gasifying furnace that gasifies solid fuel or liquid fuel;
   a gas turbine that drives a turbine to generate power by using combustion gas generated by burning mixed gas of compressed air compressed in a compressor and as generated in the gasifying furnace in a combustor;
   a booster that boosts compressed air bled from the compressor, and feed the compressed air to the gasifying furnace;
   a bleed source valve that is provided in a bleed line between the compressor and the booster;
   an abnormality stop controller that stops the booster and the gas turbine, based on an opening angle of the bleed source valve or a bleed pressure on an upstream side of the bleed source valve
   an opening angle sensor that detects an opening angle of the bleed source valve; and
   an abnormality determining unit that determines whether the bleed source valve is abnormal, based on a difference between detected opening angle and an opening angle instruction value, wherein
   when the abnormality determining unit determines that the bleed source valve is abnormal, the abnormality stop controller stops the booster and sets a stop delay time based on a closing speed of the bleed source valve, and stops the gas turbine after the stop delay time elapses.

2. The hybrid power system according to claim 1, further comprising:
   a circulation line that returns boosted air exhausted from the booster back to an inlet of the booster, wherein
   when the abnormality determining unit determines that the bleed source valve is abnormal, the abnormality stop controller opens the circulation line.

3. The hybrid power system according to claim 1, further comprising:
   an exhaust line that exhausts boosted air exhausted from the booster to atmosphere, wherein
   when the abnormality determining unit determines that the bleed source valve is abnormal, the abnormality stop controller opens the exhaust line.

4. A hybrid power system, comprising:
   a gasifying furnace that gasifies solid fuel or liquid fuel;
   a gas turbine that drives a turbine to generate power by using combustion gas generated by burning mixed gas of compressed air compressed in a compressor and gas generated in the gasifying furnace in a combustor;
   a booster that boosts compressed air bled from the compressor, and feed the compressed air to the gasifying furnace;
   a bleed source valve that is provided in a bleed line between the compressor and the booster; and
   an abnormality stop controller that stops the booster and the gas turbine, based on an opening angle of the bleed source valve or a bleed pressure on an upstream side of the bleed source valve;
   a pressure sensor that detects the bleed pressure on the upstream side of the bleed source valve; and
   an abnormality determining unit that determines that the bleed source valve is abnormal when the detected bleed pressure exceeds a predetermined pressure upper-limit value; and
   an exhaust line that exhausts boosted air exhausted from the booster to atmosphere, wherein
   then the abnormality determining unit determines that the bleed source valve is abnormal, the abnormality stop controller stops the booster and the gas turbine, and
   when the abnormality determining unit determines that the bleed source valve is abnormal, the abnormality stop controller opens the exhaust line.

* * * * *